US012504311B2

(12) United States Patent
Ohlsson et al.

(10) Patent No.: US 12,504,311 B2
(45) Date of Patent: Dec. 23, 2025

(54) RADAR LEVEL GAUGE SYSTEM HAVING AN ANTENNA ASSEMBLY WITH A NON-PLASTIC DIELECTRIC ANTENNA BODY

(71) Applicant: Rosemount Tank Radar AB, Mölnlycke (SE)

(72) Inventors: Magnus Ohlsson, Norsholm (SE); Håkan Fredriksson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 295 days.

(21) Appl. No.: 18/188,789

(22) Filed: Mar. 23, 2023

(65) Prior Publication Data

US 2023/0341251 A1  Oct. 26, 2023

(30) Foreign Application Priority Data

Apr. 20, 2022  (EP) .................................... 22169082

(51) Int. Cl.
*G01F 23/292* (2006.01)
*G01S 13/88* (2006.01)
*H01Q 1/22* (2006.01)

(52) U.S. Cl.
CPC .......... *G01F 23/2922* (2013.01); *G01S 13/88* (2013.01); *H01Q 1/225* (2013.01)

(58) Field of Classification Search
CPC .... G01F 23/284; G01F 23/2922; G01S 13/88; H01Q 1/225; H01Q 13/02; H01Q 15/02; H01Q 19/08

See application file for complete search history.

(56) References Cited

U.S. PATENT DOCUMENTS 4,566,321 A * 1/1986 Zacchio ................ G01F 23/284
 343/753
4,641,139 A * 2/1987 Edvardsson .......... G01F 23/284
 73/290 R (Continued)

FOREIGN PATENT DOCUMENTS

WO  WO 02/50954  6/2002
WO  WO 2020/160763  8/2020

OTHER PUBLICATIONS

Communication—Extended European Search Report from European Patent Application No. 22169082.9, dated Nov. 10, 2022.

*Primary Examiner* — Peter M Bythrow
(74) *Attorney, Agent, or Firm* — Westman, Champlin & Koehler, P..A.

(57) ABSTRACT

A radar level gauge system comprising: a transceiver; an antenna assembly for arrangement at an opening in a tank wall for radiating a transmit signal vertically towards the product in the tank, and to return a reflection signal resulting from reflection of the transmit signal at a surface of the product; and processing circuitry for determining the filling level based on the transmit signal and the reflection signal. The antenna assembly comprises: a non-plastic dielectric antenna body having a convex surface facing away from an interior of the tank and a planar surface facing the interior of the tank, when the antenna assembly is arranged at the opening in the tank wall; and a feed arranged to direct the transmit signal towards the convex surface of the non-plastic dielectric antenna body.

13 Claims, 4 Drawing Sheets

(56) References Cited

U.S. PATENT DOCUMENTS

| | | | | |
|---|---|---|---|---|
| 4,670,754 A * | 6/1987 | Zacchio | G01F 23/284 | 73/290 R |
| 5,594,449 A * | 1/1997 | Otto | G01F 23/284 | 73/290 R |
| 5,703,289 A * | 12/1997 | Mulrooney | G01F 23/284 | 333/252 |
| 6,684,697 B1 * | 2/2004 | Westerling | G01F 23/284 | 73/290 R |
| 6,779,397 B2 * | 8/2004 | Burger | G01F 23/284 | 73/290 R |
| 8,797,207 B2 * | 8/2014 | Kienzle | H01Q 13/02 | 343/781 R |
| 8,842,038 B2 * | 9/2014 | Edvardsson | G01F 23/284 | 342/124 |
| 8,937,577 B2 * | 1/2015 | Neto | H01Q 1/38 | 343/753 |
| 9,046,406 B2 * | 6/2015 | Mauduit | G01F 23/284 | |
| 9,091,584 B2 * | 7/2015 | Vogt | H01Q 1/225 | |
| 10,725,160 B2 * | 7/2020 | Larsson | F16B 47/006 | |
| 11,060,900 B2 * | 7/2021 | Kienzle | G01F 23/284 | |
| 11,243,108 B2 * | 2/2022 | Waelde | H01Q 1/225 | |
| 11,482,770 B2 * | 10/2022 | Schultheiss | H01Q 1/225 | |
| 2002/0053238 A1 * | 5/2002 | Fahrenbach | G01F 23/284 | 73/290 R |
| 2003/0151560 A1 * | 8/2003 | Kienzle | A61P 37/02 | 343/786 |
| 2003/0167839 A1 * | 9/2003 | Burger | G01F 23/284 | 73/290 V |
| 2004/0200276 A1 * | 10/2004 | Lenk | G01F 23/284 | 73/866.5 |
| 2007/0115196 A1 * | 5/2007 | Motzer | G01F 23/284 | 343/786 |
| 2009/0262038 A1 * | 10/2009 | Gerding | H01Q 19/06 | 343/753 |
| 2010/0031753 A1 * | 2/2010 | Mayer | G01F 1/663 | 73/290 R |
| 2012/0262331 A1 * | 10/2012 | Kienzle | H01Q 19/08 | 361/679.01 |
| 2014/0047917 A1 * | 2/2014 | Vogt | H01Q 1/42 | 333/252 |
| 2015/0122013 A1 * | 5/2015 | Lenk | G01F 23/284 | 73/290 V |
| 2015/0241261 A1 * | 8/2015 | Cheng | G01F 23/284 | 342/124 |
| 2016/0341825 A1 * | 11/2016 | Morgenstern | F27D 21/00 | |
| 2017/0184437 A1 * | 6/2017 | Welle | G01S 13/42 | |
| 2017/0309989 A1 * | 10/2017 | Waelde | G01S 13/88 | |
| 2019/0353514 A1 * | 11/2019 | Kienzle | G01S 13/88 | |
| 2020/0003603 A1 * | 1/2020 | Uddh | H01Q 13/02 | |
| 2020/0251805 A1 * | 8/2020 | Schultheiss | G01F 23/284 | |
| 2020/0256718 A1 * | 8/2020 | Waelde | G01F 23/284 | |
| 2021/0143533 A1 * | 5/2021 | Nagaishi | H01Q 1/422 | |
| 2021/0223088 A1 * | 7/2021 | Storch | H01Q 13/02 | |
| 2022/0049984 A1 * | 2/2022 | Winfried | H01Q 13/02 | |
| 2022/0082426 A1 * | 3/2022 | Wälde | G01S 7/032 | |
| 2022/0228900 A1 * | 7/2022 | Fredriksson | H01Q 19/06 | |
| 2022/0299352 A1 * | 9/2022 | Nilsson | G01S 13/88 | |
| 2023/0006357 A1 * | 1/2023 | Yuan | H01Q 21/24 | |

* cited by examiner

RADAR LEVEL GAUGE SYSTEM HAVING AN ANTENNA ASSEMBLY WITH A NON-PLASTIC DIELECTRIC ANTENNA BODY

CROSS-REFERENCE TO RELATED APPLICATION

This application claims priority to European Patent Application No. 22169082.9, filed Apr. 20, 2022, the content of which is hereby incorporated by reference in its entirety.

TECHNICAL FIELD OF THE INVENTION

The present invention relates to a radar level gauge system.

TECHNICAL BACKGROUND

Radar level gauge (RLG) systems are in wide use for determining filling levels in tanks. Radar level gauging is generally performed either by means of non-contact measurement, whereby electromagnetic signals are radiated towards the product in the tank, or by means of contact measurement, often referred to as guided wave radar (GWR), whereby electromagnetic signals are guided towards and into the product by a probe. The probe is generally arranged to extend vertically from the top towards the bottom of the tank.

An electromagnetic transmit signal is generated by a transceiver and propagated towards the surface of the product in the tank, and an electromagnetic reflection signal resulting from reflection of the transmit signal at the surface is propagated back towards to the transceiver.

Based on a timing relation between the transmit signal and the reflection signal, the distance to the surface of the product can be determined.

For some applications, such as for non-contact radar level gauge systems using microwave signals in a relatively high frequency band, an antenna assembly including a so-called plano-convex lens may advantageously be used. A plano-convex lens is a dielectric antenna body having a convex surface and a planar surface opposite the convex surface.

US 2009/0262038 discloses such a plano-convex lens having the convex surface facing the interior of the tank. US 2020/0256718 discloses a plano-convex lens having the convex surface facing the radar signal source, and the planar surface designed as a contact surface to rest on a surface of a non-metallic container for measurement through the container wall. According to US 2020/0256718, this arrangement may save installation space and allows for easier mounting of the radar measuring device.

High-frequency non-contact radar level gauge measurement provides several advantages, such as a narrower measurement beam and more compact dimensions. The latter in particular allows for installation of the radar level gauge system in various tanks where pre-existing openings may be too small for conventional non-contact radar level gauge systems with lower frequencies, such as around 26 GHz or less.

For high-temperature high-pressure (HTHP) applications, the use of radar level gauge systems of the GWR type is currently favored. Although typically well-suited, radar level gauge systems of the GWR type have their limitations. For instance, applications where violent fluid movement can be expected to occur require special considerations.

It would be desirable to provide for use of high-frequency non-contact radar level gauge systems also for HTHP-applications.

SUMMARY

In view of the above, a general object of the present invention is to provide for use of high-frequency non-contact radar level gauge systems for HTHP-applications.

According to the present invention, it is therefore provided a radar level gauge system, for determining a filling level of a product in a tank, the radar level gauge system comprising: a transceiver for generating, transmitting and receiving electromagnetic signals; an antenna assembly for arrangement at an opening in a tank wall for radiating an electromagnetic transmit signal from the transceiver vertically towards the product in the tank, and to return an electromagnetic reflection signal resulting from reflection of the transmit signal at a surface of the product back towards the transceiver; and processing circuitry for determining the filling level based on the transmit signal and the reflection signal, wherein the antenna assembly comprises: a non-plastic dielectric antenna body having a convex surface facing away from an interior of the tank and a planar surface facing the interior of the tank, when the antenna assembly is arranged at the opening in the tank wall; and a feed arranged to direct the transmit signal towards the convex surface of the non-plastic dielectric antenna body from a position resulting in substantially plane wave propagation of the transmit signal towards the surface of the product in the tank, following passage of the transmit signal through the non-plastic dielectric antenna body.

The "transceiver" may be one functional unit capable of transmitting and receiving electromagnetic signals, or may be a system comprising separate transmitter and receiver units.

It should be noted that the processing circuitry may be provided as one device or several devices working together.

The electromagnetic transmit signal may advantageously be a microwave signal. For instance, the transmit signal may be frequency and/or amplitude modulated on a carrier in the microwave frequency range.

An example center frequency of the electromagnetic transmit signal may be at least 60 GHz. Advantageously, the center frequency may be in the range 75-85 GHZ, such as about 80 GHz.

The present invention is based on the realization that a high-frequency non-contact radar level gauge system can be adapted to HTHP-applications through the use of a plano-convex lens (a dielectric antenna body having a convex surface and a planar surface) that fulfills certain criteria. One criterion is that the planar surface of the plano-convex lens faces the interior of the tank when the antenna assembly is arranged at an opening in the tank wall. The present inventors have realized that this arrangement allows the lens to be substantially arbitrarily thick without changing the properties of the transmit signal. This in turn makes it possible to withstand a high process pressure, such as may be present in HTHP-applications. Another criterion is that the plano-convex lens is made of a non-plastic dielectric, which allows the lens to maintain its shape also when subjected to high pressure and high temperature.

According to embodiments, the antenna assembly may be configured in such a way that the planar surface of the non-plastic dielectric antenna body is angled in respect of a horizontal plane when the antenna assembly is arranged at the opening in the tank wall. This promotes drip off of condensate from the planar surface of the non-plastic dielectric antenna body, which provides for improved measurement performance, in particular for HTHP-applications that may be prone to condensation on surfaces. An example of such an application is level gauging in boilers.

Advantageously, when the planar surface is angled as described above, the convex surface of the non-plastic dielectric antenna body may be shaped to focus the transmit signal from the feed to a plane wave propagating inside the non-plastic dielectric antenna body towards the planar surface of the non-plastic dielectric antenna body; and the planar surface of the non-plastic dielectric antenna body may be oriented to refract the plane wave to propagate vertically towards the surface of the product in the tank when the antenna assembly is arranged at the opening in the tank.

In summary, aspects of the present invention thus relate to a radar level gauge system comprising: a transceiver; an antenna assembly for arrangement at an opening in a tank wall for radiating a transmit signal vertically towards the product in the tank, and to return a reflection signal resulting from reflection of the transmit signal at a surface of the product; and processing circuitry for determining the filling level based on the transmit signal and the reflection signal. The antenna assembly comprises: a non-plastic dielectric antenna body having a convex surface facing away from an interior of the tank and a planar surface facing the interior of the tank, when the antenna assembly is arranged at the opening in the tank wall; and a feed arranged to direct the transmit signal towards the convex surface of the non-plastic dielectric antenna body.

BRIEF DESCRIPTION OF THE DRAWINGS

These and other aspects of the present invention will now be described in more detail, with reference to the appended drawings, wherein.

DETAILED DESCRIPTION OF EXAMPLE EMBODIMENTS OF THE INVENTION

Figure 1:
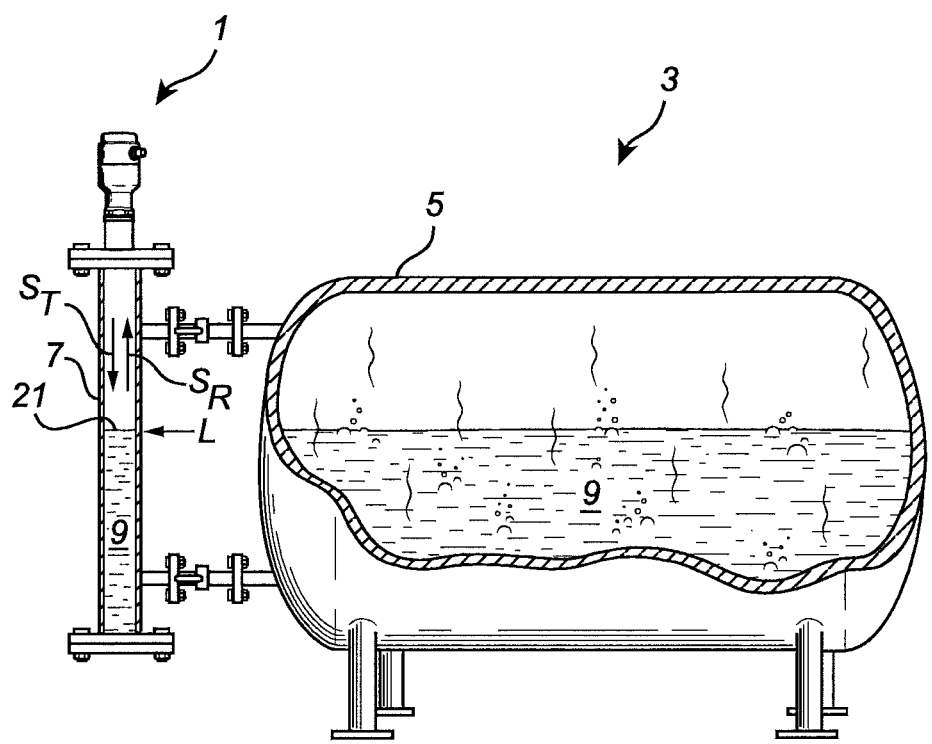
FIG. 1 schematically shows a radar level gauge system according to an example embodiment of the present invention in an exemplary HTHP-application.

FIG. 1 schematically shows a radar level gauge system 1 according to an example embodiment of the present invention in an exemplary HTHP-application. In the example illustrated in FIG. 1, the HTHP-application is a simplified boiler 3, with a boiler drum 5, and a chamber 7 (often also referred to as a bridle). The boiler drum 5 is in fluid communication with the chamber 7 so that the level L of product 9 (in this case water) in the chamber 7 corresponds to the level in the boiler drum 5. Thus, the boiler drum 5 and the chamber 7 together form a tank, and the opening at the top of the chamber 7 is an opening in the tank wall.

Figure 2:
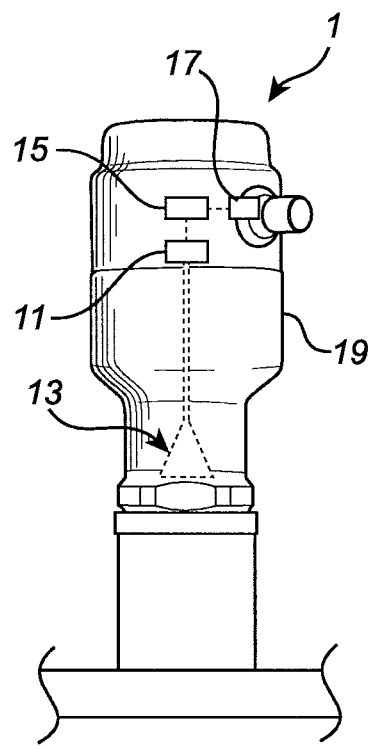
FIG. 2 is a block diagram schematically illustrating the radar level gauge system in FIG. 1.

With reference to FIG. 2, the radar level gauge system 1 in FIG. 1 comprises a transceiver 11, an antenna assembly 13, processing circuitry 15, and a communication interface 17 inside a housing 19. The transceiver 11 is configured to generate, transmit and receive electromagnetic signals. As was also mentioned above, the transceiver 11 may be configured to generate electromagnetic signals having a center frequency of at least 40 GHz. Preferably, the center frequency may be at least 60 GHz, and most preferably, the center frequency may be in the range 75 GHz-85 GHz. The antenna assembly 13 is configured for arrangement at an opening in the tank wall, as is schematically shown in FIG. 1, for radiating an electromagnetic transmit signal $S_T$ from the transceiver 11 vertically towards the product in the tank 3, and to return an electromagnetic reflection signal $S_R$ resulting from reflection of the transmit signal $S_T$ at a surface 21 (FIG. 1) of the product 9 back towards the transceiver 11. The processing circuitry 15 is coupled to the transceiver 11, and configured to determine the filling level L based on the transmit signal $S_T$ and the reflection signal $S_R$, using per se known techniques. The determined filling level L may be communicated to a remote host using the communication interface 17, which may be any suitable wired or wireless communication interface in the art. It should be noted that the opening in the tank wall may alternatively be provided in the wall of the boiler drum 5, and that the antenna assembly 13 may be arranged at such an opening to measure the level L in the boiler drum 5 directly. In such a configuration, there may be a ball valve between the interior of the boiler drum 5 and the antenna assembly 13.

The antenna assembly 13 comprised in the radar level gauge system 1 in FIG. 2 is suitable both for the high frequency of the transmitted and received signals and for the particular challenges associated with HTHP-applications. An HTHP-application may be classified as an application where the antenna assembly 13 may be subjected to a pressure of up to 400 bar and a temperature of up to 450° C. Such severe process conditions lead to requirements on the mechanical integrity of the components included in the antenna assembly 13, even for very high temperatures.

Figure 3:
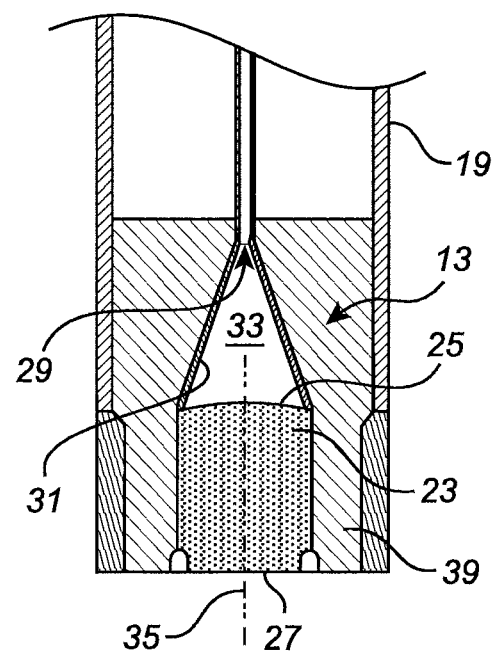
FIG. 3 is a schematic cross-section view of a first example of an antenna assembly configuration that may be comprised in the radar level gauge system in FIG. 2.

For this reason, initially referring to the first example configuration in FIG. 3, the antenna assembly 13 included in embodiments of the radar level gauge system 1 according to the present invention comprises a non-plastic dielectric antenna body 23 having a convex surface 25 facing away from an interior of the tank 3 and a planar surface 27 facing the interior of the tank 3, when the antenna assembly 13 is arranged at the opening in the tank wall, as is shown in FIG. 1. The antenna assembly 13 further comprises a feed 29 arranged to direct the transmit signal towards the convex surface 25 of the non-plastic dielectric antenna body 23 from a position resulting in substantially plane wave propagation of the transmit signal $S_T$ towards the surface 21 of the product 9 in the tank 3, following passage of the transmit signal $S_T$ through the non-plastic dielectric antenna body 23.

This arrangement of the feed 29 in combination with a suitable configuration of the non-plastic dielectric antenna body 23 allows the antenna assembly 13 to provide sufficient functionality even at the severe HTHP-conditions. In particular, the selection of a non-plastic material, that maintains its structural integrity at temperatures in excess of 450° C., and the thickness (distance between the convex surface 25 and the planar surface 27) made possible by arranging the planar surface 27 facing the interior of the tank 3, contribute to the desired HTHP-performance of the antenna assembly 13.

Since various configurations of the feed 29 may have side lobes spilling energy onto the interior walls of the antenna housing, the antenna assembly 13 may advantageously comprise a microwave-absorbing envelope 31 enclosing a space 33 between the feed 29 and the non-plastic dielectric antenna body 23. Preferably, the microwave-absorbing envelope 31 may be made of a temperature-resistant material, such as a woven or non-woven carbon fiber-based structure.

The non-plastic dielectric antenna body 23 may advantageously be made of a suitable ceramic or glass. Examples of suitable ceramics include alumina, Macor®, and Vitro 800 Ceramic. The latter two are examples of machinable high-temperature ceramics supplied by the company Final Advanced Materials of France. As an alternative to a ceramic material, a suitable glass material may be used, for example fused quartz or similar.

In the first exemplary configuration of the antenna assembly 13 in FIG. 3, the convex surface 25 of the non-plastic dielectric antenna body 23 is shaped to focus the transmit signal from the feed 29 to a plane wave propagating inside the non-plastic dielectric antenna body 23 towards the planar surface 27 of the non-plastic dielectric antenna body 23, along the optical axis 35 of the non-plastic dielectric antenna body 23. In this antenna assembly 13 configuration, the wavefronts of the plane wave are parallel to the planar surface 27, so that the transmit signal $S_T$ is not refracted at the interface between the non-plastic dielectric antenna body 23 and the atmosphere inside the tank 3 (inside the chamber 7).

Although the first example configuration of the antenna configuration 13 schematically shown in FIG. 3 provides for the above-described HTHP-performance, it would be desirable to additionally provide for a reduced occurrence of condensate accumulating on the planar surface 27.

Example configurations of the antenna assembly 13 adapted to provide for such a reduced occurrence of condensate accumulation will now be described with reference to FIG. 4 and FIG. 5.

Figure 4:
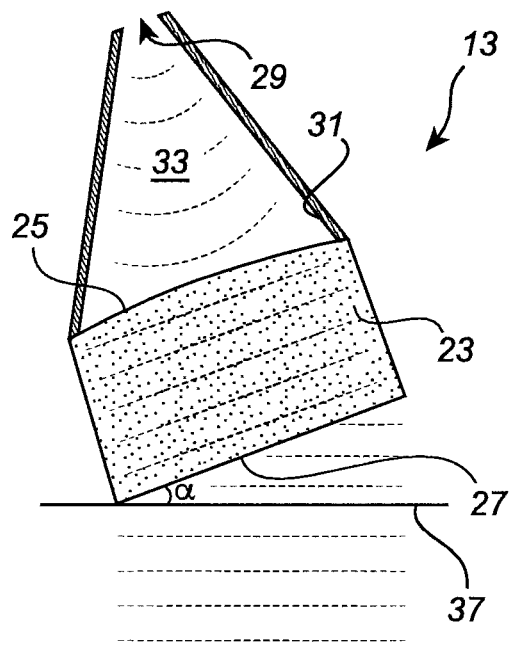
FIG. 4 is a schematic cross-section view of a second example of an antenna assembly configuration that may be comprised in the radar level gauge system in FIG. 2.

Turning first to FIG. 4, which a schematic cross-section view of a second example of an antenna assembly 13 configuration that may be comprised in the radar level gauge system 1 in FIG. 2, it can be seen that this antenna assembly 13 is configured in such a way that the planar surface 27 of the non-plastic dielectric antenna body 23 is angled in respect of a horizontal plane 37, when the antenna assembly 13 is arranged at the opening in the tank wall.

For efficient removal (drip-off) of condensate, the angle α between the planar surface 27 of the non-plastic dielectric antenna body 23 and the horizontal plane 37 may be at least 10° when the antenna assembly 13 is arranged at the opening in the tank wall.

To achieve the desired plane wave propagation of the transmit signal $S_T$ vertically towards the surface 21 of the product 9, the convex surface 25 of the non-plastic dielectric antenna body 23 may be shaped to focus the transmit signal from the feed 29 to a plane wave propagating inside the non-plastic dielectric antenna body 23 towards the planar surface 27 of the non-plastic dielectric antenna body 23, and the planar surface 27 of the non-plastic dielectric antenna body 23 may be oriented to refract the plane wave to propagate vertically towards the surface 21 of the product 9 in the tank 3 when the antenna assembly 13 is arranged at the opening in the tank, as is shown in FIG. 1. A person of ordinary skill in the art will be able to determine a suitable shape of the convex surface 25 and a suitable orientation of the planar surface 27 using basic knowledge of the material properties of the non-plastic dielectric antenna body 23 in combination with commercially available microwave lens simulation software. FIG. 4 schematically shows exemplary wave propagation, from the feed 29 to the interior of the tank 3.

Figure 5:
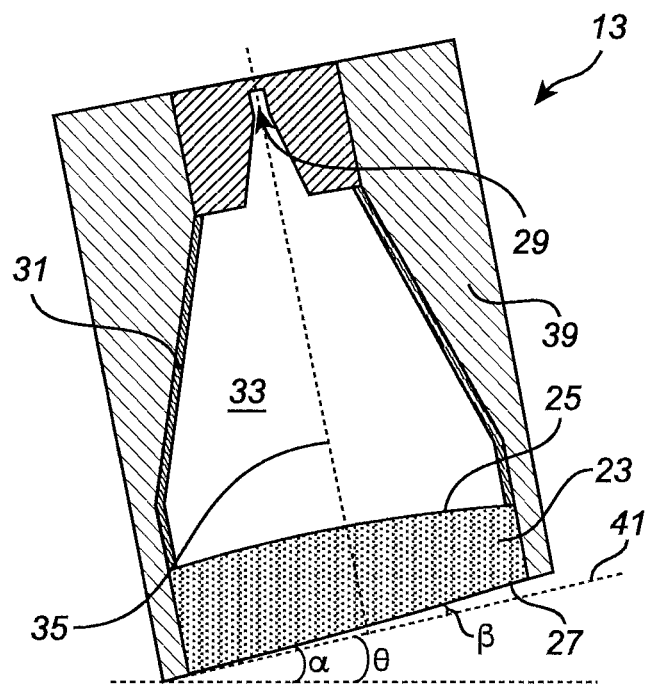
FIG. 5 is a schematic cross-section view of a third example of an antenna assembly configuration that may be comprised in the radar level gauge system in FIG. 2.

FIG. 5 is a schematic cross-section view of a third example of an antenna assembly 13 configuration that may be comprised in the radar level gauge system 1 in FIG. 2. As in the second example configuration of the antenna assembly 13 in FIG. 4, the third example configuration of the antenna assembly 13 in FIG. 5 has a non-plastic dielectric antenna body 23 where the convex surface 25 is shaped to focus the transmit signal from the feed 29 to a plane wave propagating inside the non-plastic dielectric antenna body 23 towards the planar surface 27, and the planar surface 27 is oriented to refract the plane wave to propagate vertically towards the surface 21 of the product 9 in the tank 3 when the antenna assembly 13 is arranged at the opening in the tank, as is shown in FIG. 1.

In the third example configuration of the antenna configuration 13 in FIG. 5, the convex surface 25 is a hyperbolic surface that is symmetric in relation to the optical axis 35 of the non-plastic dielectric antenna body 23, and the planar surface 27 of the non-plastic dielectric antenna body 23 is angled—with an angle β—in relation to a plane 41 that is perpendicular to the optical axis 35. As can be seen in FIG. 5, there is also, like in FIG. 4, an angle α between the planar surface 27 of the non-plastic dielectric antenna body 23 and the horizontal plane 37. Since the refractive index of the non-plastic dielectric antenna body 23 is greater than the refractive index of the atmosphere in the tank 3, this angle α is greater than an angle θ between the planar surface 27 of the non-plastic dielectric antenna body 23 and the plane 41 that is perpendicular to the optical axis 35. The angles α and β (or θ and β) are selected to achieve plane wave propagation in the vertical direction when the antenna assembly 13 is arranged at the opening in the tank wall.

Figure 6:
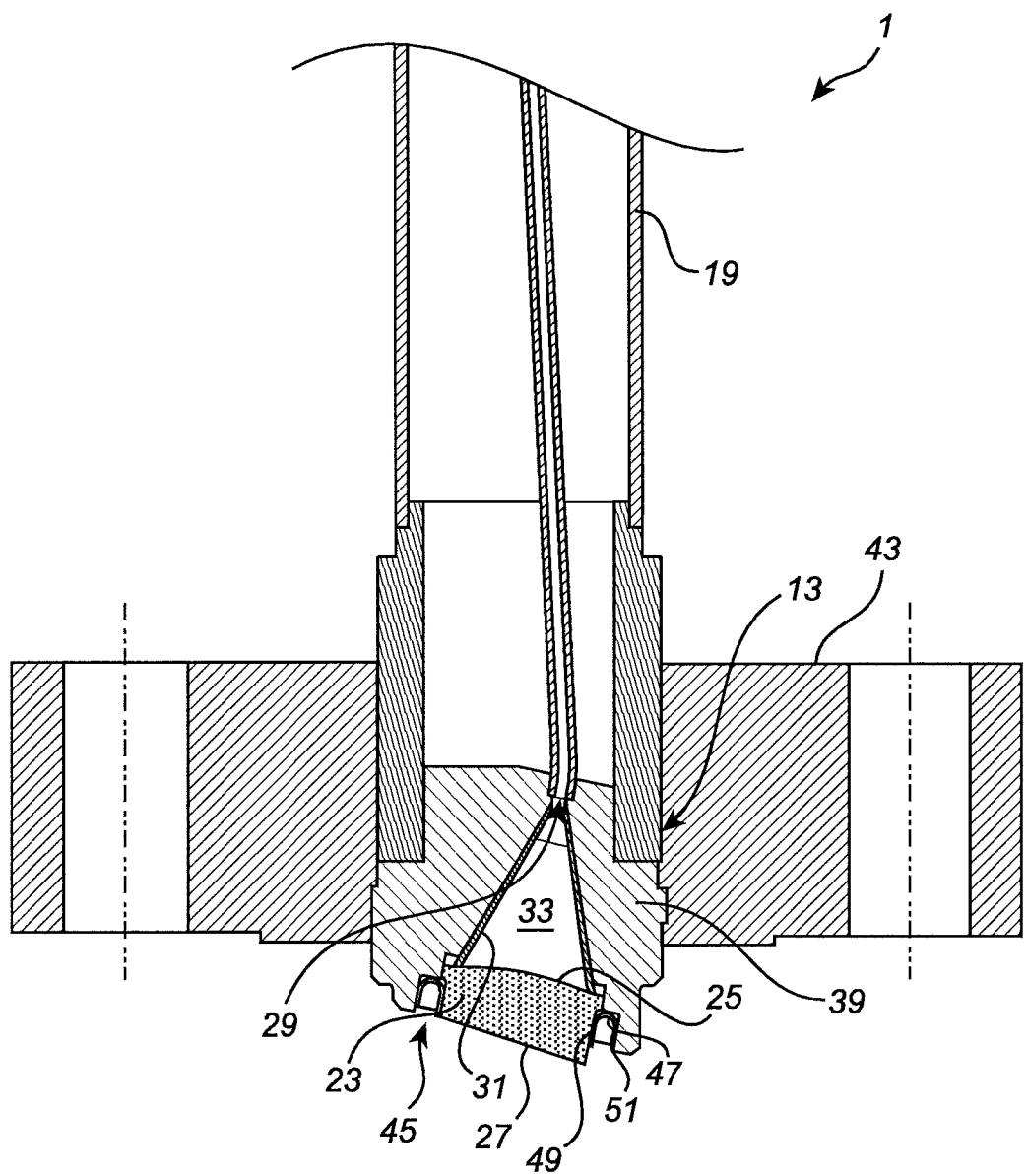
FIG. 6 is a more detailed cross-section view of the antenna assembly configuration in FIG. 5, showing exemplary configurations of a feed for the transmit signal and a sealing attachment between the non-plastic dielectric antenna body and a housing structure of the radar level gauge system.

FIG. 6 is a more detailed cross-section view of the antenna assembly configuration in FIG. 5, showing exemplary configurations of the feed 29 for the transmit signal and a sealing attachment between the non-plastic dielectric antenna body 23 and the housing structure 39 of the radar level gauge system 1. In FIG. 6, the feed 29 includes a bent waveguide pipe with thin walls to transfer as little heat as possible from the hot bottom part of the antenna assembly 13 to the electronics (the transceiver 11, the processing circuitry 15, and the communication interface 17) in the housing 19. The outer distance pipe included in the housing 19 is also designed as a thin wall pipe for this reason. The lengths of these two pipes can be adjusted to fit different temperature requirements.

With reference to FIG. 6, the radar level gauge system 1 (only partially shown in FIG. 6) includes a tank interface structure 43, here in the form of a flange, for fixing the radar level gauge system 1 to the tank wall, and a housing structure 39 holding the non-plastic dielectric antenna body 23 in relation to the feed 29 and in relation to the tank interface structure 43. As in the example configurations described so far with main reference to FIG. 3, FIG. 4, and FIG. 5, the purpose of the housing structure 39 is to hold the non-plastic dielectric antenna body 23 in such a way that the transmit signal from the feed 29 hits the convex surface 25 from a direction resulting in the desired plane wave propagation of the transmit signal inside the non-plastic dielectric antenna body 23, and in such a way that the transmit signal propagates vertically towards the surface 21 of the product 9 in the tank 3 when the radar level gauge system 1 is mounted at the tank 3 and in operation.

For HTHP-application, there is typically a gas-tight connection between the lens—the non-plastic dielectric antenna body 23—and the housing structure 39. According to embodiments, this may be achieved by a brazing joint 45. As is shown in FIG. 6, this brazing joint 45 may include a metal ring 47 with a C-shaped cross-section, a first joint 49 formed by brazing between the non-plastic dielectric antenna body 23 and the metal ring 47 (one leg of the C), and a second joint 51 formed by brazing or welding between the housing structure 39 and the metal ring 47 (the other leg of the C).

The person skilled in the art realizes that the present invention by no means is limited to the preferred embodiments described above. On the contrary, many modifications and variations are possible within the scope of the appended claims.

What is claimed is:

1. A radar level gauge system, for determining a filling level of a product in a tank, the radar level gauge system comprising:
    a transceiver for generating, transmitting and receiving electromagnetic signals;
    an antenna assembly for arrangement at an opening in a tank wall for radiating an electromagnetic transmit signal from the transceiver vertically towards the product in the tank, and to return an electromagnetic reflection signal resulting from reflection of the transmit signal at a surface of the product back towards the transceiver; and
    processing circuitry for determining the filling level based on the transmit signal and the reflection signal,
    wherein the antenna assembly comprises:
        a non-plastic dielectric antenna body having a convex surface facing away from an interior of the tank and a planar surface facing the interior of the tank, when the antenna assembly is arranged at the opening in the tank wall; and
        a feed arranged to direct the transmit signal towards the convex surface of the non-plastic dielectric antenna body from a position resulting in substantially plane wave propagation of the transmit signal towards the surface of the product in the tank, following passage of the transmit signal through the non-plastic dielectric antenna body,
    wherein the antenna assembly is configured in such a way that the planar surface of the non-plastic dielectric antenna body is angled in respect of a horizontal plane when the antenna assembly is arranged at the opening in the tank wall.

2. The radar level gauge system according to claim 1, wherein an angle between the planar surface of the non-plastic dielectric antenna body and the horizontal plane is at least 10° when the antenna assembly is arranged at the opening in the tank wall.

3. The radar level gauge system according to claim 1, wherein:
    the convex surface of the non-plastic dielectric antenna body is shaped to focus the transmit signal from the feed to a plane wave propagating inside the non-plastic dielectric antenna body towards the planar surface of the non-plastic dielectric antenna body; and
    the planar surface of the non-plastic dielectric antenna body is oriented to refract the plane wave to propagate vertically towards the surface of the product in the tank when the antenna assembly is arranged at the opening in the tank.

4. The radar level gauge system according to claim 3, wherein:
    the convex surface is a hyperbolic surface that is symmetric in relation to an optical axis of the non-plastic dielectric antenna body; and
    the planar surface of the non-plastic dielectric antenna body is angled in relation to a plane that is perpendicular to the optical axis.

5. The radar level gauge system according to claim 4, wherein an angle between the planar surface of the non-plastic dielectric antenna body and the horizontal plane is greater than an angle between the planar surface of the non-plastic dielectric antenna body and the plane that is perpendicular to the optical axis.

6. The radar level gauge system according to claim 1, wherein the non-plastic dielectric antenna body is made of a ceramic or a glass.

7. The radar level gauge system according to claim 6, wherein the non-plastic dielectric antenna body is made of an aluminum-based oxide or a silicon-based oxide.

8. The radar level gauge system according to claim 1, wherein the antenna assembly further comprises a microwave-absorbing envelope enclosing a space between the feed and the non-plastic dielectric antenna body.

9. The radar level gauge system according to claim 8, wherein the microwave-absorbing envelope is made of a high-temperature material, such as a woven or non-woven carbon fiber-based structure.

10. The radar level gauge system according to claim 1, wherein the radar level gauge system includes:
    a tank interface structure for fixing the radar level gauge system to the tank wall; and
    a housing structure holding the non-plastic dielectric antenna body in relation to the feed and in relation to the tank interface structure.

11. The radar level gauge system according to claim 10, wherein the non-plastic dielectric antenna body is attached to the housing structure by a brazing joint.

12. The radar level gauge system according to claim 11, wherein the brazing joint includes:
    a metal ring with a C-shaped cross-section;
    a first joint formed by brazing between the non-plastic dielectric antenna body and the metal ring; and
    a second joint formed by brazing or welding between the housing structure and the metal ring.

13. The radar level gauge system according to claim 1, wherein a center frequency of the transmit signal is higher than 40 GHz.

* * * * *